May 15, 1945.   H. W. GILFILLAN   2,375,781
POWER TRANSMISSION
Filed Aug. 8, 1941   2 Sheets-Sheet 1

INVENTOR
*Henry W. Gilfillan.*
BY
*Harness, Lind, Patee & Harris*
ATTORNEYS

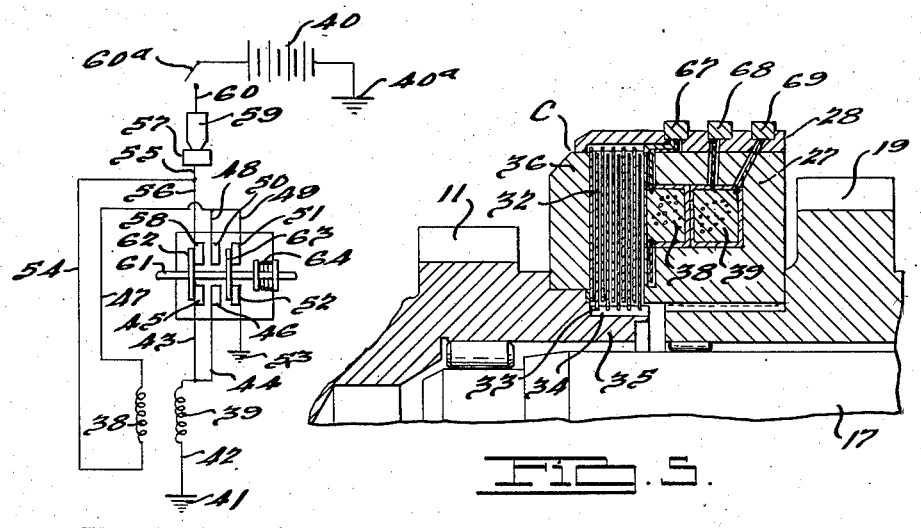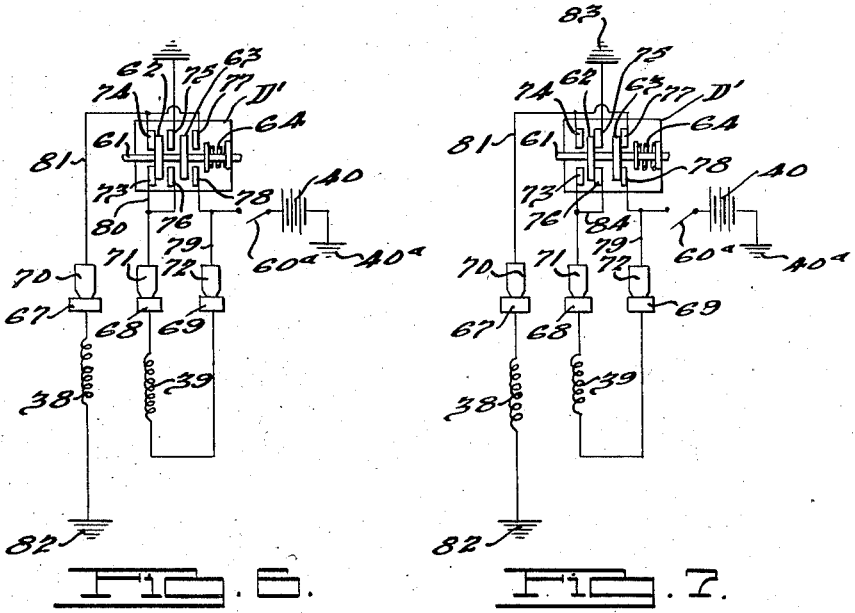

Patented May 15, 1945

2,375,781

UNITED STATES PATENT OFFICE 2,375,781

POWER TRANSMISSION

Henry W. Gilfillan, Detroit, Mich., assignor to Chrysler Corporation, Highland Park, Mich., a corporation of Delaware Application August 8, 1941, Serial No. 406,029

11 Claims. (Cl. 123—179)

This invention relates to motor vehicles and refers more particularly to improvements in power transmission therefor.

On certain types of power transmission systems employing an overrunning drive and electrical control device it is sometimes impossible to start a "dead" engine by towing (pushing or pulling) the car where the usual storage battery has dropped in voltage to a point where it will not operate the electrical control. Such battery failure usually occurs in cold weather. One of such types of transmissions is arranged for a relatively slow speed one-way drive incorporating an overrunning control and a relatively fast speed two-way drive under control of an electrical device and arranged to bridge the one-way drive.

It is an object of my invention to provide means for effecting operation of the electrical device so that the engine may be started by towing in the event of a voltage drop in the battery.

In carrying out my invention I provide a plurality of flux generating field coils for the electrical control device and switch means so arranged that for normal operation of the transmission the coils are arranged in series but for cold starting, where the battery voltage is down, the coils are arranged in parallel under control of the switch means. In one embodiment of my invention the switch means is arranged for mounting with the coils and in another embodiment the switch means is mounted independently of the coils. Where the coils are mounted for rotation the first of said embodiments is the simpler arrangement as it avoids the necessity of multiple slip-rings which are required in the second of said embodiments.

Further objects and advantages of my invention reside in the novel combination and arrangement of parts more particularly hereinafter described and claimed, reference being had to the accompanying drawings in which:

Fig. 4 is a similar view showing the circuit arrangement for cold starting conditions.

Fig. 5 is a view of a portion of the Fig. 1 transmission illustrating a modified arrangement.

Fig. 6 is a wiring diagram for the Fig. 5 electrical drive control device showing the circuit arrangement for normal drive conditions.

Fig. 7 is a similar view showing the circuit arrangement for cold starting conditions.

Figure 1:
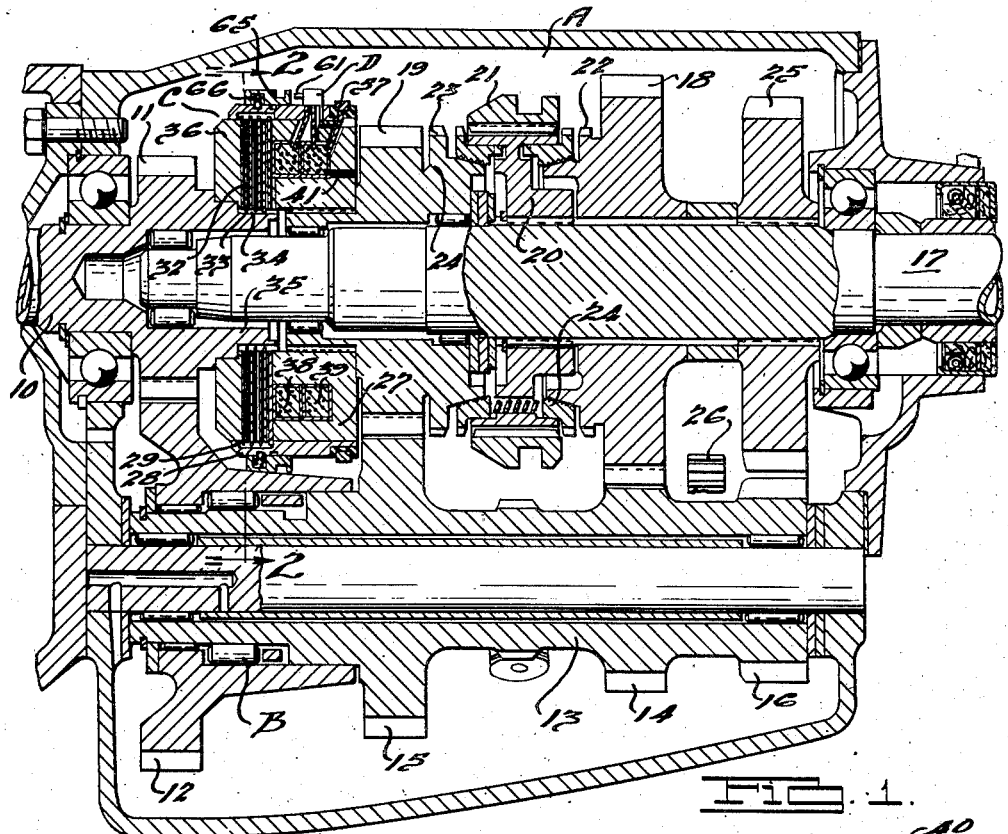
Fig. 1 is a longitudinal sectional elevational view through a typical transmission showing my invention incorporated therewith.

Referring to the drawings, I have illustrated my invention in connection with a transmission wherein one or more pairs of relatively engageable drive control elements are arranged to control a transmission drive, the drive control elements being in the form of a clutch and preferably of the frictionally engageable magnetically controlled type as will presently be more apparent.

Referring to the transmission A of Fig. 1, reference character 10 represents the driving shaft adapted to receive power from the usual vehicle engine, this shaft carrying the main drive pinion 11 which is in constant mesh with gear 12. This gear drives countershaft 13 through an overrunning clutch B of the usual type such that when shaft 10 drives in its usual clockwise direction (looking from front to rear) then clutch B will engage to lock gear 12 to countershaft 13 whenever gear 12 tends to drive faster than the countershaft. However, whenever this gear 12 tends to rotate slower than the countershaft then clutch E will automatically release whereby shaft 10, under certain conditions, may readily drop its speed while countershaft 13 continues to revolve.

Countershaft 13 comprises cluster gears 14, 15 and 16 which respectively provide drives in first, third, and reverse. Freely rotatable on the driven or output shaft 17, which is axially aligned with shaft 10, are the first and third driven gears 18 and 19 respectively in constant mesh with countershaft gears 14 and 15. A hub 20 is splined on shaft 17 and carries therewith a shiftable sleeve 21 adapted for shift in any desired manner, such as manually, from the Fig. 1 neutral position either rearwardly to clutch with teeth 22 of gear 18 or else forwardly to clutch with teeth 23 of gear 19. If desired, toothed blocker synchronizer rings 24 may be located between sleeve 21 and teeth 22, 23 to insure shift of sleeve 21 only when the parts to be clutched are synchronized as is now well known and as set forth, for example, in the copending application of O. E. Fishburn, Ser. No. 180,840 filed December 20, 1937, now Patent No. 2,333,165.

Shaft 17 also carries reverse driven gear 25 fixed thereto. A reverse idler gear 26 is suitably mounted so that when reverse is desired, idler 26 is shifted rearwardly into mesh with gears 16 and 25.

First, third, and reverse speed ratio drives and neutral are preferably under manual shift control of the vehicle driver by manipulation of sleeve 21 or gear 26.

First is obtained by shifting sleeve 21 to clutch with teeth 22, the drive passing from pinion 11 to gear 12 thence through clutch B to countershaft 13. From the countershaft this drive is through gears 14, 18 and sleeve 21, hub 20 to shaft 17.

Third is obtained by shifting sleeve 21 forwardly to clutch with teeth 23, the drive passing from pinion 11 to countershaft 13 as before, thence through gears 15, 19 and sleeve 21 to shaft 17.

Reverse is obtained by shifting idler 26 into mesh with gears 16 and 25, sleeve 21 being in neutral, the reverse drive passing from shaft 10 to the countershaft 13 as before, thence through gears 16, 26 and 25 to shaft 17.

I have provided clutching means comprising an electromagnetic device C for operably connecting and disconnecting pinion 11 and gear 19 so as to step-up the speed ratio drive from first to second and from third to fourth which is a direct drive speed ratio. When driving in first, second is obtained by engaging clutch C, the drive then passing from pinion 11 through clutch C to gears 19 and 15 thence through countershaft 13 and gears 14, 18 to sleeve 21 and shaft 17, clutch B overrunning. By similar operation, the drive may be stepped up from third to direct by engaging clutch C accompanied by overrun at clutch B, the drive passing from pinion 11 through clutch C to gear 19 thence to sleeve 21 and shaft 17. When driving in second or fourth, first or third may be respectively obtained simply by releasing clutch C accompanied by speeding up the engine to engage clutch B.

Clutch C comprises a flux-conducting coil-receiving annular channeled electromagnet 27 which, in the illustrated type of transmission, is carried by gear 19 and always rotating therewith, the electromagnet being disposed between gears 11 and 19. Welded or otherwise fixed to the outer annulus of electromagnet 27 is a forwardly projecting annular sleeve 28, of low permeability material, this sleeve having internal splines 29 for receiving the tongues 30 of the thin flux-conducting friction driven disks or elements 31. Between adjacent disks 31 there is a generally similar driving disk element 32, these disks terminating outwardly short of sleeve 28 and having inner tongues 33 for engagement with splines 34 of the rear extension 35 of pinion 11.

A magnetic pressure plate 36 is seated on extension 35 for movement toward electromagnet 27, the disks 31, 32 being disposed in closely associated relationship between plate 36 and electromagnet 27 so that when the electromagnet is energized, as will presently be apparent, the flux operates in a closed path or magnetic circuit around electromagnet 27, through disks 31, 32 and plate 36 such that the plate 36 and disks 31, 32 are drawn toward the electromagnet serving to frictionally pack the disks together and thereby drivingly connect pinion 11 with gear 19. A small portion of the flux in the aforesaid magnetic circuit is shunted at each disk 31, 32 but this is utilized to draw the disks together. To insure most of the flux following the complete circuit, each disk 31, 32 is formed with a plurality of axial slots 37 therethrough, these slots being registered with each other so that most of the flux is prevented from shunting through the disks and is made to travel through the prescribed circuit including plate 36. In order to disengage clutch C it is only necessary to de-energize the electromagnet 27.

In order to energize the electromagnet 27, I have provided a pair of coils 38 and 39 which are disposed within the channel of the electromagnet for rotation therewith. These coils are arranged for series energization at times, and for parallel energization at other times.

Figure 3:
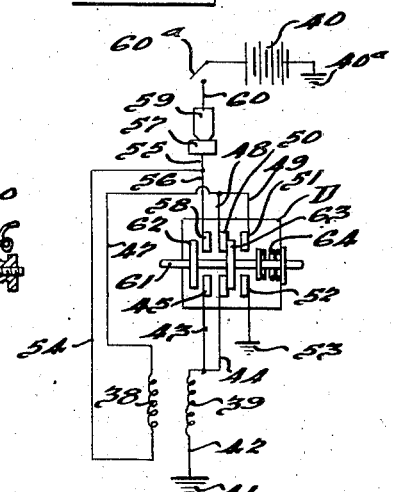
Fig. 3 is a wiring diagram for the Fig. 1 electrical drive control device showing the circuit arrangement for normal drive conditions.

Referring to Fig. 3 I have illustrated the manner of wiring the coils with relation to a source of energization at storage battery 40 and a control switch D. From a ground 41 in the transmission itself a lead 42 extends to one end of coil 39 from the other end of which branch conductors 43, 44 extend to switch terminals 45, 46 respectively. From one end of coil 38 a conductor 47 has branches 48, 49 leading to switch terminals 50, 51 respectively. A further switch terminal 52 is grounded at 53. From the other end of coil 38 there extends a conductor 54 having branches 55, 56 respectively connected to a slip ring 57 and switch terminal 58.

The slip ring 57 is carried through suitable insulation by sleeve 28 and is constantly engaged by a brush conductor 59 connected by conductor 60 through a switch 60ª to battery 40 and ground 40ª. The switch D has an operating plunger 61 extending into the switch casing where the plunger carries the conductor bars 62, 63 insulated from each other. A spring 64 biases plunger 61 to its Fig. 3 position whereby switch conductors 46, 50 are connected by bar 63 while the pairs of switch conductors 45, 48 and 51, 52 are disconnected. In order to operate the switch as in Fig. 4, I have provided a shift sleeve 65 slidably mounted on sleeve 28 and adapted for shift from the Fig. 1 position rearwardly under control of a detent 66 to a second position for causing plunger 61 to assume its Fig. 4 position. The sleeve 65 may be shifted by any suitable remote control mechanism (not shown) under control of the vehicle driver.

Fig. 3 illustrates the position of switch D for normal control of clutch C. When it is desired to engage clutch C, switch 60ª is closed thereby energizing electromagnet 27 by a circuit comprising coils 38 and 39 arranged in series. This circuit is as follows: 40ª, 40, 60ª, 60, 59, 57, 55, 54, coil 38, 47, 48, 50, 63, 46, 44, coil 39, 42, 41. Engagement and disengagement of clutch C is therefore controlled by switch 60ª and when sleeve 65 is in its normal Fig. 1 position the coils 38 and 39 are in series in the energizing circuit aforesaid.

Where the coils in series are of such capacity that they will accommodate normal battery voltage of about 6 volts and properly engage the clutch C with approximately 3 amperes in the coils 38, 39 then when the voltage in the battery drops to say 3 volts then only 1½ amperes would pass through the coils and this would not, under the assumed conditions, be adequate to engage clutch C. However, if the coils are arranged in parallel the resistance of the coils is divided in two equal parts so that with the assumed 3 volts battery delivery the total resulting current will be four times as great and the ampere turns of the coils twice as great as with series connection at 3 volts. The resistance across the parallel arranged coils will be about ¼ the resistance across the series arranged coils so that the ampere turns in parallel at 3 volts is the same as ampere turns in series at 6 volts. Normal battery voltage of about 6 volts should not, of course, be impressed for any length of time on the parallel arranged coils as the current of about 3 amperes would burn the coils.

When it is desired to start the engine by towing the car, under conditions where the battery voltage has dropped below that required for normally engaging clutch C with the switch D in its Fig. 3 position, the driver shifts sleeve 65 rearwardly to cause switch D to assume its Fig. 4 position wherein switch terminals 46, 50 are now disconnected and the pairs of terminals 45, 58 and 51, 52 are now respectively connected by conductors 62 and 63. Under such condition the coils 38 and 39 are now arranged in parallel in the circuit which is as follows: 40ª, 40, 60ª, 60, 59, 57, 55 whence the current branches. One branch circuit portion continues from 55 to 56, 58, 62, 45, 43, coil 39, 42, 41. The other branch circuit portion continues from 55 to 54, coil 38, 47, 49, 51, 63, 52, 53. The parallel coil circuit is likewise controlled by switch 60ª for engaging and disengaging clutch C. After the engine has been started and the system restored for normal operation, as by building up the voltage in battery 40 or by supply of adequate voltage by the usual generator, sleeve 65 is restored to the Fig. 1 position.

Switch D may be operated for the parallel coil relationship at other times than when it is desired to drive shaft 10 from shaft 17, as when the voltage for any reason is inadequate to fully engage clutch C with the series coil relationship.

Instead of locating switch D with the rotating sleeve 28 as in Fig. 1, I may position the switch remotely from this sleeve for stationary mounting at any convenient point as at the vehicle dash where the operator may push plunger 61 when it is desired to cause the coils 38, 39 to be in parallel instead of in series. Such arrangement is illustrated in Figs. 5 to 7 wherein Figs. 5 and 6 illustrate the normal arrangement of series relationship of the coils and Fig. 7 the cold starting parallel coil arrangement.

Figure 2:
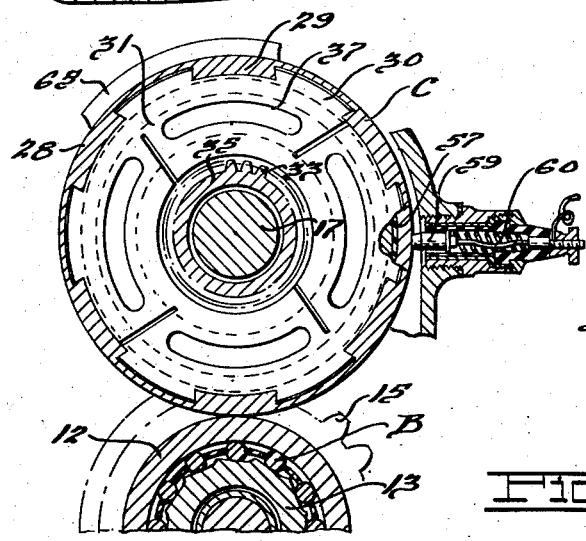
Fig. 2 is a detail sectional elevational view taken in accordance with line 2—2 of Fig. 1.

In the Fig. 5 arrangement I have employed three slip rings 67, 68 and 69 each having a brush 70, 71, 72, respectively, similar to that shown at 59 in Fig. 2 for ring 57. Switch D' has pairs of terminals 73, 74; 75, 76; and 77, 78. In Fig. 6 with switch D' in its normal illustrated position and with switch 60ª closed, then clutch C will be engaged and coils 38 and 39 will be arranged in series in the following circuit: Ground 40ª to battery 40 and switch 60ª to conductor 79, thence through brush 72 and slip ring 69 to coil 39 and slip ring 68, thence by brush 71 through conductor 80 to switch terminal 73, bar 62 and terminal 74 to conductor 81 whence the circuit continues through brush 70, ring 67 and coil 38 to ground 82.

When the plunger 61 is operated to its Fig. 7 position, the coils are placed in parallel circuits as follows: ground 40ª and battery 40 through switch 60ª where the circuit branches to grounds 82 and 83. One branch circuit continues from switch 60ª to contact 78 thence by bar 63 and contact 77 to conductor 81 whence the circuit extends through coil 38 to ground 82. The other branch circuit from switch 60ª extends through conductor 79, ring 69 to coil 39 and ring 68 thence by conductor 84 to contact 76, bar 62 and contact 75 to ground 83.

It will be understood that the Fig. 5 arrangement may be substituted for the corresponding parts in the Fig. 1 transmission for the same operative functions and results.

The various electrical parts will, of course, be suitably electrically insulated so as to function as intended.

I claim:

1. In a transmission for driving a motor vehicle the combination comprising a driving shaft adapted to receive drive from the engine, a driven shaft adapted to receive drive from the driving shaft for driving the vehicle, an electrically energizable device adapted when energized to connect said shafts for drive transmission therebetween, a plurality of field coils for energizing said device, said coils being normally connected in series with each other during all energization of said device for driving said vehicle, a storage battery, circuit means including said coils and said battery, and switch means for controlling said circuit means such that said coils may be arranged in parallel in said circuit means upon an abnormal drop in battery voltage to provide the normally required energizing current in said coils to energize said device and connect said shafts for drive transmission therebetween.

2. In a transmission for driving a motor vehicle the combination comprising a driving shaft adapted to receive drive from the engine, a driven shaft adapted to receive drive from the driving shaft for driving the vehicle, an electrically energizable clutch device adapted when energized to connect said shafts for drive transmission therebetween, a plurality of field coils for energizing said device, said coils being normally connected in series with each other during all energization of said device for driving said vehicle, a storage battery, circuit means including said coils and said battery, and switch means for controlling said circuit means such that said coils may be arranged in parallel in said circuit means upon an abnormal drop in battery voltage to provide the normally required energizing current in said coils to energize said device and connect said shafts for drive transmission therebetween.

3. A transmission for driving a motor vehicle comprising a driving shaft adapted to receive drive from the engine, a driven shaft adapted to receive drive from the driving shaft for driving the vehicle, means for transmitting drive between said shafts, a rotatable electrically energized device having a plurality of field coils for controlling said drive-transmitting means, a source of electrical energy, circuit means including said coils and said energy source, switch means mounted for rotation with said device and operable to selectively connect said coils either in series or in parallel with each other in said circuit means, and means to actuate said switch means to one or the other of said selected arrangements of said coils.

4. In a motor vehicle drive, drive transmitting means, a clutch for controlling said drive transmitting means, electrically energizable means having a plurality of field coils for controlling said clutch, a source of electrical energy, circuit means including said coils and said energy source, and switch means mounted for rotation with said clutch and operable to selectively connect said coils either in series or in parallel with each other in said circuit means, and means also mounted for rotation with said clutch for actuating said switch means.

5. In a motor vehicle drive, drive control means comprising a plurality of flux-conducting disks adapted to frictionally engage each other, a plurality of field coils in flux-generating relationship with said disks, a source of electrical energy, circuit means including said coils and said energy source, switch means operable to selectively connect said coils either in series or in parallel with each other in said circuit means, and means for mounting said switch means for rotation with said coils.

6. A transmission according to claim 1, and means for biasing said switch means to normally effect said series coil arrangement.

7. A transmission according to claim 3, including means for normally biasing said switch actuating means into condition thereof for effecting said series coil arrangement.

8. In a drive for a motor vehicle having an engine, a driving shaft adapted to be driven from the engine, a driven shaft adapted to be driven from said driving shaft for driving the vehicle, a clutch for controlling drive transmission between said shafts such that when said clutch is operative said shafts are drivingly connected and when said clutch is inoperative said shafts are drivingly disconnected, electrically energizable means comprising a plurality of field coils adapted to be energized for effecting said operation of said clutch, said coils being normally connected in series with each other during all operation of said clutch for driving the vehicle a source of electrical energy comprising a storage battery, electrical circuit means for said coils and battery comprising switch means positionable to selectively maintain said coils in series or arrange said coils in parallel with each other, said battery having a voltage normally sufficient to provide required current for energization of said coils when in series to effect operation of said clutch but being incapable of providing required current for effecting said operation of said clutch with said coils arranged in series with each other upon abnormal drops in voltage, and means operating under control of the vehicle driver to normally maintain said switch means positioned for series arrangement of said coils when the voltage of said battery is sufficient to effect said operation of said clutch, and to accommodate positioning of said switch means to effect said parallel arrangement of said coils when the voltage of said battery has dropped as aforesaid thereby to provide energizing current to said coils in amount sufficient to effect said operation of said clutch for driving the vehicle or drive of the engine for starting the same by towing the vehicle.

9. In a motor vehicle drive according to claim , means for mounting said switch means for rotation with said coils.

10. In a drive for a motor vehicle having an engine, a driving shaft adapted to be driven from the engine, a driven shaft adapted to be driven from said driving shaft for driving the vehicle, a clutch for controlling drive transmission between said shafts such that when said clutch is operative said shafts are drivingly connected and when said clutch is inoperative said shafts are drivingly disconnected, electrically energizable means comprising a plurality of field coils adapted to be energized for effecting said operation of said clutch, said coils being normally connected in series with each other during all operation of said clutch for driving the vehicle, a source of electrical energy comprising a storage battery, electrical circuit means for said coils and battery, switch means on said clutch for so controlling said circuit means as to maintain said coils in series or arrange them in parallel with each other, said battery having a voltage normally sufficient to provide required current for energization of said coils when in series to effect operation of said clutch but being incapable of providing required current for effecting said operation of said clutch with said coils arranged in series with each other upon abnormal drops in voltage, and means for biasing said switch means to normally maintain said series coil arrangement, said biasing means being adapted to accommodate operation of said switch means to effect said parallel coil arrangement upon abnormal drop in voltage of said battery to thereby provide energizing current to said coils sufficient to effect said operation of said clutch for driving the vehicle or drive of the engine for starting the same by towing the vehicle.

11. In a motor vehicle of the type equipped with a storage battery for supplying required energizing current to the normally series-arranged coils of an electrically energizable clutch, for controlling drive of the vehicle from the engine thereof, the method of starting said engine under conditions of clutch failure due to abnormally low battery voltage comprising, operably arranging said coils in parallel circuits with the battery to thereby provide said coils with sufficient energizing current to enable positive engagement of said clutch and towing the vehicle with the clutch so engaged to turn the engine over.

HENRY W. GILFILLAN.